(12) United States Patent
Biegelsen

(10) Patent No.: US 6,677,926 B2
(45) Date of Patent: Jan. 13, 2004

(54) ELECTROPHORETIC DISPLAY DEVICE

(75) Inventor: David K. Biegelsen, Portola Valley, CA (US)

(73) Assignee: Xerox Corporation, Stamford, CT (US)

( * ) Notice: Subject to any disclaimer, the term of this patent is extended or adjusted under 35 U.S.C. 154(b) by 232 days.

(21) Appl. No.: 09/880,284

(22) Filed: Jun. 11, 2001

(65) Prior Publication Data

US 2002/0186197 A1 Dec. 12, 2002

(51) Int. Cl.[7] .................................................. G09G 3/34
(52) U.S. Cl. ........................................ 345/107; 359/296
(58) Field of Search ................................ 345/107, 105; 359/296; 349/155, 156, 158

(56) References Cited

U.S. PATENT DOCUMENTS

| | | | |
|---|---|---|---|
| 4,143,103 A | | 3/1979 | Sheridon et al. ............... 264/4 |
| 4,657,349 A | * | 4/1987 | Labes et al. ................. 359/296 |
| 4,919,521 A | * | 4/1990 | Tada et al. ................... 359/296 |
| 5,717,283 A | | 2/1998 | Biegelsen et al. ........... 313/483 |
| 5,750,191 A | | 5/1998 | Hachey et al. ............ 427/163.4 |
| 5,894,367 A | | 4/1999 | Sheridon et al. ............ 359/623 |
| 5,907,382 A | * | 5/1999 | Kajiura et al. .............. 349/158 |
| 6,110,538 A | | 8/2000 | Sheridon et al. ............. 427/457 |
| 6,337,729 B1 | * | 1/2002 | Morii .......................... 349/155 |
| 6,392,786 B1 | * | 5/2002 | Albert ......................... 359/296 |
| 6,441,881 B1 | * | 8/2002 | Enomoto et al. ............ 349/156 |
| 6,456,272 B1 | * | 9/2002 | Howard et al. .............. 345/107 |
| 6,486,866 B1 | * | 11/2002 | Kuwahara et al. ........... 345/107 |
| 6,535,326 B2 | * | 3/2003 | Uno ............................. 359/296 |

* cited by examiner

Primary Examiner—Steven Saras
Assistant Examiner—Fritz Alphonse
(74) Attorney, Agent, or Firm—Linda M. Robb

(57) ABSTRACT

An electrophoretic display sheet is disclosed which includes a medial layer, formed by a plurality of spheres, which is disposed between a transparent non-conductive first sheet and a non-conductive bottom sheet. The plurality of spheres in the medial layer forms interstices which are filled by a suspension medium in which is suspended at least one form of electrophoretic material.

20 Claims, 5 Drawing Sheets

ELECTROPHORETIC DISPLAY DEVICE

INCORPORATIONS BY REFERENCE

The following patents are hereby incorporated by reference into this application: U.S. Pat. No. 5,750,191 to Hachey et al. titled "Retroreflective Elements"; U.S. Pat. No. 5,717,283 by Biegelsen et al. titled "Display Sheet with a Plurality of Hourglass Shaped Capsules Containing Marking Means Responsive to External Fields"; U.S. Pat. No. 4,143,103 by Sheridon titled "Method of Making a Twisting Ball Panel Display"; U.S. Pat. No. 5,894,367 by Sheridon titled "Twisting Cylinder Display Using Multiple Chromatic Values"; and U.S. Pat. No. 6,110,538 by Sheridon titled "Method of Making a Gyricon Display Using Magnetic Latching".

CROSS REFERENCE TO RELATED APPLICATIONS

The following copending, coassigned U.S. Patent Applications are related to this case:

U.S. patent application Ser. No. 09/880,152 (Attorney Docket No. D/99665), titled "Large Area Micro-Structure Template for Creation of Closely-Packed Arrays".

BACKGROUND OF THE INVENTION

This invention relates generally to external field activated displays and more particularly concerns an external field activated display sheet which utilizes a medial layer of disperse spheres around which liquid can be moved by applying an external field across the display sheet.

Typically, a display device, in sheet form, comprises a thin sheet, which has many attributes of a paper document. It looks like paper, has ambient light valve behavior like paper (i.e. the brighter the ambient light, the more easily it may be seen), is flexible like paper, can be carried around like paper, can be written on like paper, can be copied like paper, and has nearly the archival memory of paper.

There have been different approaches to making a field induced display sheet such as U.S. Pat. No. 3,668,106 titled "Electrophoretic Display Device", in which an electrophoretic material in a finely divided powder form is suspended in a suspension medium interposed between a pair of electrodes. When an electric field is imposed across the electrophoretic suspension layer, the spatial distribution of the electrophoretic material in the suspending medium causes the optical reflective property of the suspension layer to change.

In U.S. Pat. No. 3,756,693 titled "Electrophoretic Display Device", an electrophoretic material in a finely divided powder form is suspended in a suspension medium interposed between a pair of electrodes. A colored layer of a desired pattern is provided at the transparent electrode. When an electric field is imposed between the pair of electrodes, the optical property of the suspension layer changes due to the changing spatial distribution of the electrophoretic material.

An alternate approach was disclosed in U.S. Pat. No. 5,717,283 titled "Display Sheet with a Plurality of Hourglass Shaped Capsules Containing Marking Means Responsive to External Fields", in which the display sheet contains a plurality of hourglass shaped capsules for each pixel of an image. Each hourglass shaped capsule contains ink in one of its chambers. With the application of an external electric field, ink is moved from one chamber to the other in each hourglass shaped capsule to display an image. Visibility of the ink is otherwise blocked by an opaque medial plane.

A major problem in electrophoretic display sheets is gravitational settling of the electrophoretic pigment particles in directions perpendicular to the field direction. A cure has been segmentation of the display sheet either by encapsulation of the electrophoretic medium into small volumes or introducing a porous matrix. The porous matrix is problematic in that it introduces a high flow impedance and causes trapping of pigment particles against horizontal or concave walls. Smooth spheres have negligible horizontal surfaces and no concavity. Accordingly, it is an object of this invention to provide a hiding layer using an array of spheres, which facilitates transport of pigment particles between sides of a medial plane.

SUMMARY OF THE INVENTION

Briefly stated, and in accordance with one aspect of the present invention, an electrophoretic display sheet is disclosed which includes a transparent non-conductive top layer, a non-conductive bottom layer, and a medial layer comprised of a plurality of spheres. The interstices formed by the spheres and the top and bottom sheets are filled with a suspension medium in which is suspended at least one form of electrophoretic material.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Figure 1A:
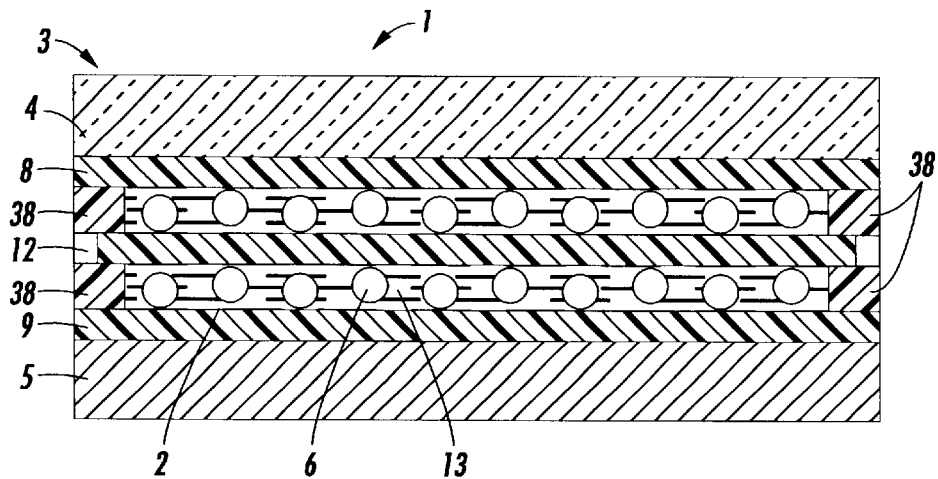
FIGS. 1a and 1b show cross sectional views of a prior art display sheet.

Referring to FIG. 1a, which shows an example of a prior art device, reference character 1 designates a display and/or recording panel which has an electrophoretic suspension layer 2 therein. When suspension layer 2 is in a liquid state, it is enclosed within housing 3 having a frame 38 and two opposed major housing walls 4 and 5, which are transparent.

Suspension layer 2 includes a dispersion of an electrophoretic material 6 in a finely divided powder form suspended in a suspending medium 13. Electrophoretic as used herein shall mean "to be capable of movement through a solution upon exposure to an electric field". A first electrode 8 and a second electrode 9, which are transparent, are attached to the inner surfaces of the two opposing housing walls 4 and 5. A colored porous layer 12 is inserted in colorless suspending medium 13. In FIG. 1a a color which is a mixture of the colors of the electrophoretic material 6 and the colored porous layer 12 can be seen from both electrodes.

Figure 1B:
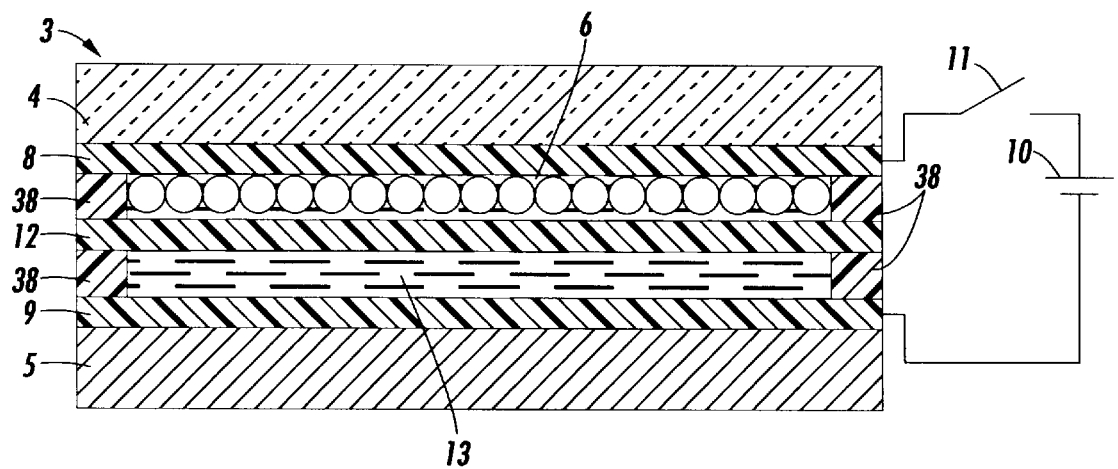

When a D.C. electric field is applied across the two electrodes 8 and 9, the electrophoretic material 6 is caused to pass through the colored porous layer 12 and to be deposited on one electrode, for example the anode, depending upon its polarity, as shown in FIG. 1b. When a layer of the electrophoretic material 6 deposited on the anode has enough hiding power, the device of FIG. 1b has the same color as the electrophoretic material 6 on the anode side. When this is the case, colored porous layer 12 hides the layer of electrophoretic material 6 deposited on the anode, giving the device viewed from the cathode side the same color as porous layer 12. The color characteristic can be reversed by reversing the polarity of the applied potential. However, in operation, the medial layer of the prior art introduces an impedance that causes trapping of pigment particles against the horizontal medial plane.

Figure 2:
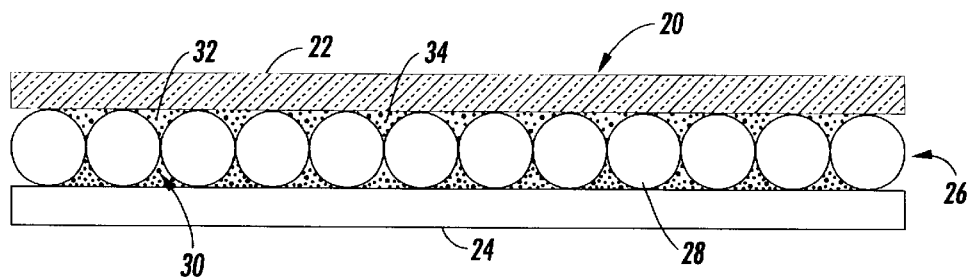
FIG. 2 shows a two pixel wide cross sectional view of one embodiment of the display sheet of this invention.

Referring now to FIG. 2, there is shown a cross sectional view of one embodiment of the display sheet 20 of this invention. The electric display sheet 20, which generally has a thickness less than 20 mils, comprises two layers 22 and 24 and a medial layer 26. Layers 22 and 24 may be comprised of any of a wide range of transparent polymers commercially available in film or sheet form including: poly(ethylene terephthalate) (Mylar®), bis-phenol-A poly(carbonate) (Lexan®), poly(methylmethacrylate) (Plexiglas®), etc. Transparent as used herein shall mean "having low optical absorption so that objects may be easily seen on the other side". Medial layer 26 is an array of tightly packed spheres 28, which may be white, opaque, and highly reflective. In this embodiment spheres 28 have a uniform distribution over the entire sheet 20. The display sheet 20 has a plurality of cavities 30 and 34 formed between spheres 28 of medial layer 26 and layers 24 and 22 respectively. Cavities 30 and 34 are filled with a transparent liquid in which are suspended pigmented particles 32. Layers 22, 24 and medial layer 26 are all bonded together.

It should be noted that in all the drawings of this specification for the purpose of clarity where there is a plurality of each element only a few are numbered. However, it should be understood that all the elements that have the same shape as the numbered elements are the same as the numbered elements.

Figure 3:
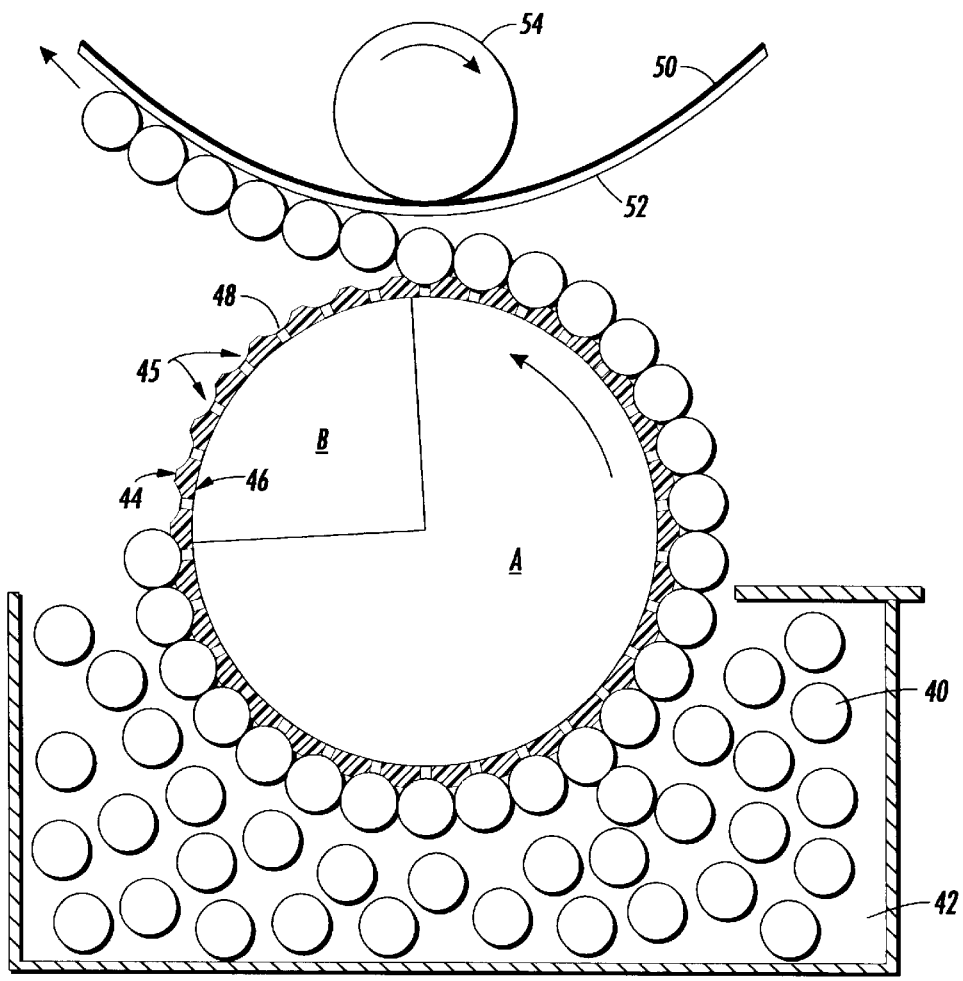
FIG. 3 shows a cross sectional view of one method for fabricating the medial and bottom layers of the display sheet of this invention.

The bottom layer 24 with closely packed monodisperse spheres may be fabricated by several methods. According to a first method, as shown in FIG. 3, spheres 40, contained in receptacle 42, in which spheres 40 are agitated by any known means. Template 44 is wrapped or formed on cylindrical form 46. The plurality of closely-packed cavities 48 in template 44 extend through the surface of cylindrical form 46. A vacuum (vacuum source not shown) is applied over region A of the interior of cylindrical form 46 with sufficient strength to attract spheres 40 into depressions 45 in template 44. As cylindrical form 46 rotates around its longitudinal axis, spheres 40 approach substrate 50. Substrate 50 is a compliant sheet that corresponds to layer 24 of FIG. 2 and has the same properties and serves the same purpose as layer 24 of FIG. 2. Substrate 50 may be coated with an adhesive on surface 52 or may be heated to soften surface 52 sufficiently for it to become tacky. As spheres 40 contact surface 52, roller 54 presses surface 52 against spheres 40. The vacuum is then released and over-pressure is applied in interior region B of cylindrical form 46, thus releasing spheres 40 from template 44. As substrate 50 moves past cylindrical form 46, spheres 40 are continuously deposited in a closely packed monodisperse layer on surface 52. To fabricate a sheet having additional layers of spheres 40, a monolayer of closely-packed spheres is formed as described above. This monolayer is then coated with an adhesive or a layer of sticky, partially cured elastomer. The sticky elastomer layer is of a depth such that its top surface is coplanar with, or slightly below, the plane in which the centers of the particles of the second layer are to lie. The second layer of particles is then dispersed over the monolayer. The second layer of particles stick to the elastomer or adhesive in a stacking that may be either random or ordered. The resulting layers of spheres 44 and substrate 50 may then be overcoated with a layer which may be an elastomer or any other desired material.

Alternatively, the substrate layer with closely packed monodisperse spheres may be fabricated according to the method described in U.S. Pat. No. 5,750,191 to Hachey et al. cited above. According to this method, spherical elements and core elements, or substrates, are combined. This combination is then agitated for a sufficient period of time and at a sufficient temperature to coat the spherical elements onto the core elements.

Yet another method to fabricate a substrate with closely packed monodisperse spheres is to apply a slurry of spheres and clear liquid containing pigment to a substrate by any known means. The excess slurry is then removed with a blade or other known means and a top layer is then bonded to the slurry layer and bottom layer to produce the display sheet described herein.

Referring again to FIG. 2, to fill the cavities 30 and 34 with liquid containing pigment, the substrate with the medial layer fixed to it are placed in a confinement where there is a clear liquid filled with the suspended pigments. By using vacuum or ultrasonic agitation, the liquid permeates all the cavities 30 and 34. Once cavities 30 and 34 are filled, layer 22 is bonded to medial layer 26 and layer 24.

Figure 4:
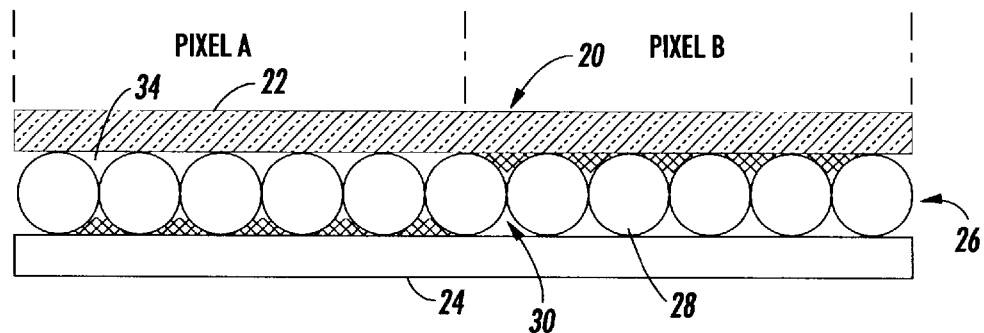
FIG. 4 shows the display sheet of FIG. 2 in operation.

Referring now to FIG. 4, there is shown a two pixel wide cross sectional view of one embodiment of the invention. In FIG. 4, it should be noted that elements 22, 24, 26, 28, 30 and 34 have the same properties and serve the same purpose as the same numbered elements in FIG. 2. The cavities 30 and 34 are completely filled with a clear liquid, which contains colored pigments. For clarity, the individual colored pigments are not shown. The liquid used in the display sheet 20 has to be electrically insulating. Since the cavities 30 and 34 are filled with the clear liquid, there is no space for any gas or air in cavities 30 and 34. By applying an electric field, such as disclosed in U.S. Pat. No. 5,717,283 cited above, or by any known manner, pigment particles can be moved by electrophoretic force from cavities 30 around spheres 28 and into cavities 34 or vice versa. Pixel B in FIG. 4 shows the pigments moved into cavities 34 with the application of an electric field, thereby covering the medial layer 26.

The electrophoretic pigment particles have a tendency to pack on layer 22 (where layer 22 forms the top surface for cavities 34) in an applied electric field. Also, electrophoretic particles have a tendency to agglomerate when there is no electric field and deagglomerate when there is an electric field. Based on the aforementioned tendencies of electrophoretic particles, upon removal of the electric field, the pigments remain in their corresponding cavities until a reverse electric field is applied to the pixel to pull the pigments back into the original cavities 30, as shown in Pixel A. Causing the electrophoretic particles to move through a medial layer of spheres rather than a porous medial layer permits more efficient movement of the pigmented particles through the suspending liquid, since there is less impediment to movement.

Figure 5:
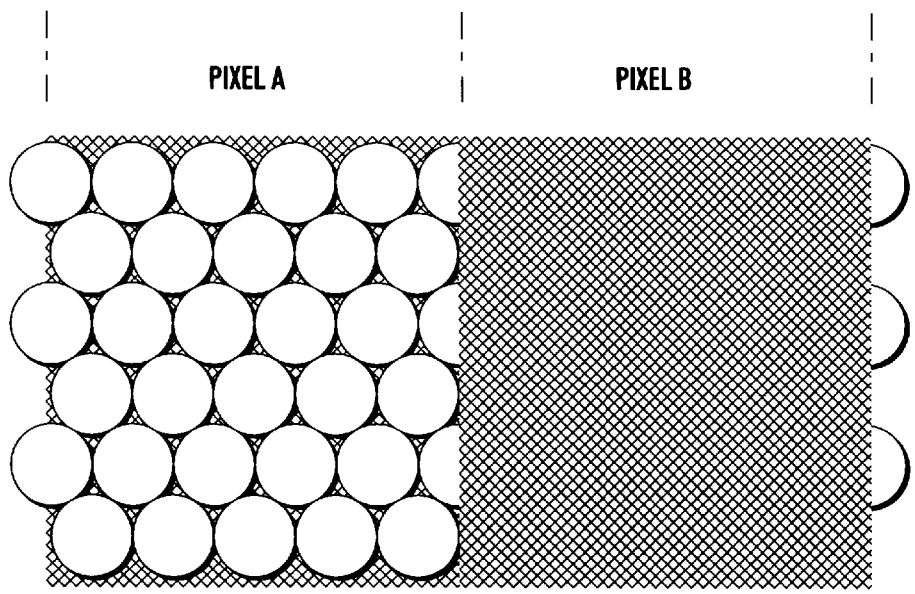
FIG. 5 shows a top view of the display sheet of FIG. 4.

FIG. 5 shows a top view of the same two pixels, with Pixel B activated. From the top of the sheet the observer sees the agglomerated electrophoretic pigment particles in Pixel B and an unpigmented Pixel A. By way of example, the spheres may be white or gray and the pigment particles may be black. In this embodiment, the sheet would appear white or gray to an observer when the pigmented particles and contained in cavities 30 of FIG. 4. When a positive electric field is applied, those pixels, such as Pixel B in FIGS. 4 and 5 would appear black. In an alternative embodiment, the spheres could be a color or black rather than white or gray, or the pigment particles could be any color or black.

It should be noted that the initiation of the flow of liquid from one cavity to another exhibits a sharp threshold with respect to the electric field. This characteristic enables the display sheet 20 to be used in conjunction with a passive addressing matrix.

Figure 6:
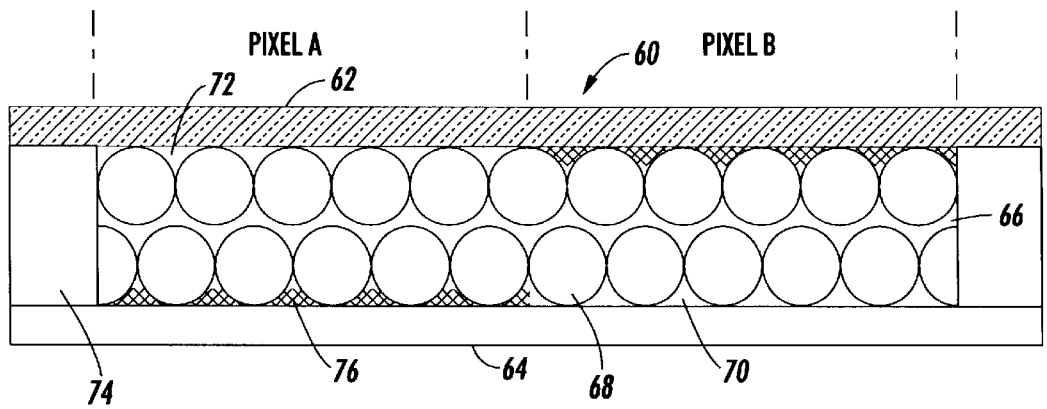
FIG. 6 shows a cross sectional view of an alternate embodiment of the display sheet of this invention.
Figure 7:
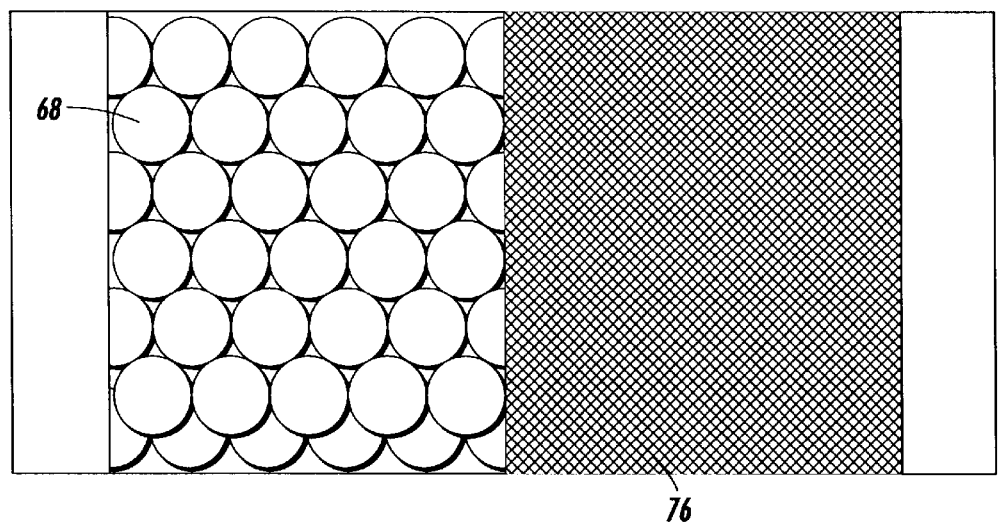
FIG. 7 shows a top view of the display sheet of FIG. 6.

As seen in FIG. 5, display contrast is limited in the case of the monolayer of spheres because 'hidden' pigment can be seen through the interstitial openings between spheres. The 'white' state is not totally white. Having two layers of spheres packed in a hexagonal close packing enables complete visual blocking of the hidden pigment. Referring now to FIGS. 6 and 7, there is shown a two pixel cross sectional view of another embodiment of the invention. In this embodiment, medial layer 66 is comprised of at least two layers of spheres 68 bonded between layer 62 and layer 64. Bridge elements 74 may be included to aid lamination of the layers, or the layers may be vacuum laminated. Medial layer 66 may be deposited on layer 64 by any of the methods described herein, or alternatively the spheres 68 may be mixed in a slurry with the electrophoretic liquid then deposited on layer 64 with a blade.

The cavities 70 and 72 are completely filled with a clear liquid or colored liquid, which contains colored electrophoretic pigments. For clarity, the individual colored pigments are not shown. The liquid 76 and electrophoretic pigments used in the display sheet 60 have the same properties and serve the same purpose as the liquid and suspended pigmented particles 32 in FIG. 2. By applying an electric field, as described above, pigment particles can be moved by electrophoretic force from cavities 70 around spheres 68 and into cavities 72 or vice versa. Pixel B in FIG. 6 shows the pigments moved into cavities 72 with the application of a positive electric field, thereby covering the medial layer 66.

As described hereinabove, the electrophoretic pigment particles have a tendency to pack on layer 62 (where layer 62 forms the top surface for cavities 72) in an applied electric field. Also, electrophoretic particles have a tendency to agglomerate when there is no electric field and deagglomerate when there is an electric field. Based on the aforementioned tendencies of electrophoretic particles, upon removal of the electric field, the pigments remain in their corresponding cavities until a reverse electric field is applied to the pixel to pull the pigments back into the original cavities 70, as shown in Pixel A.

FIG. 7 shows a top view of the same two pixels, with Pixel B activated. From the top of the sheet the observer sees the agglomerated electrophoretic pigment particles in Pixel B and an unpigmented Pixel A. By way of example, the spheres may be white or gray and the pigment particles may be black. In this embodiment, the sheet would appear white or gray to an observer when the pigmented particles and contained in cavities 70 of FIG. 6. When an electric field is applied, those pixels, such as Pixel B in FIGS. 6 and 7 would appear black. In an alternative embodiment, the spheres could be a color or black rather than white or gray, or the pigment particles could be any color or black.

Figure 8:
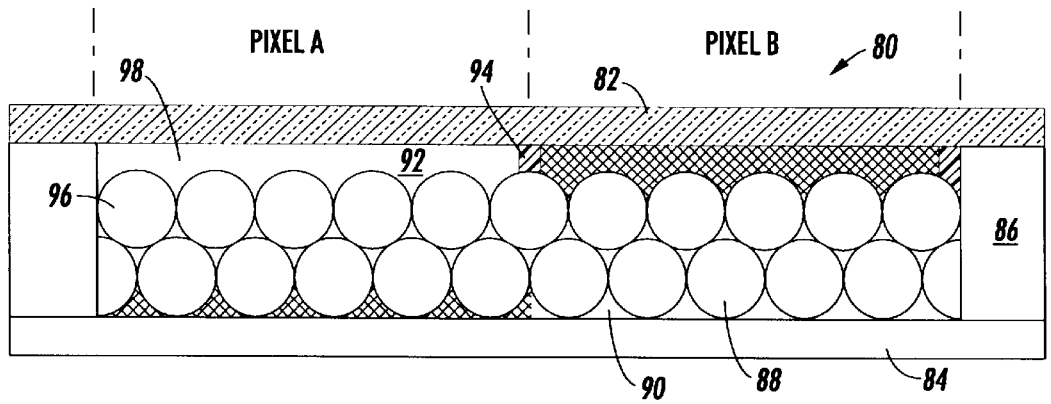
FIG. 8 shows a cross sectional view of an alternate embodiment of the display sheet of this invention.
Figure 9:
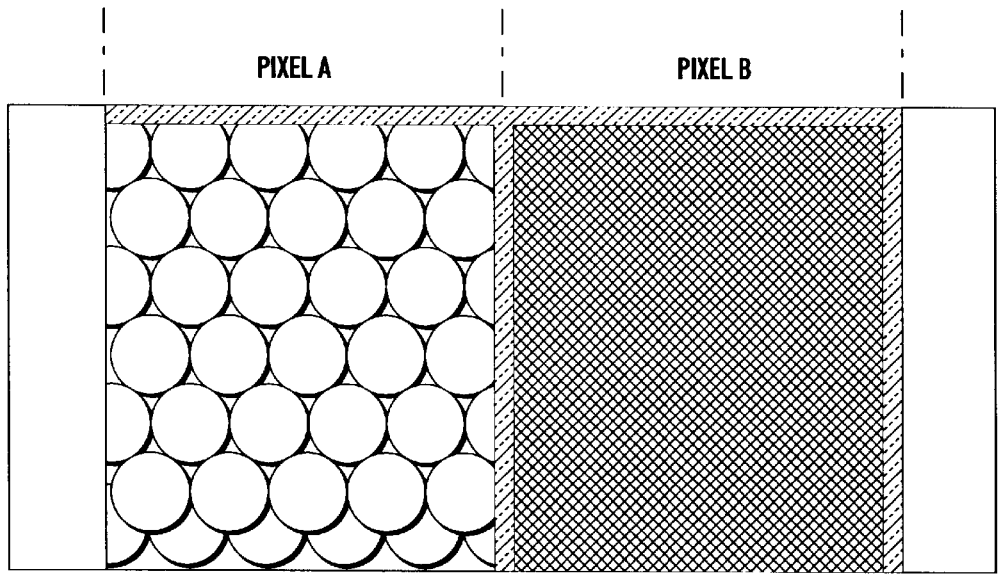
FIG. 9 shows a top view of the display sheet of FIG. 8.

In yet another embodiment, FIGS. 8 and 9 show a cross sectional two pixel view of display sheet 80. In this embodiment, medial layer 96 is comprised of at least two layers of spheres 88 bonded between layer 82 and layer 84. Spheres 88 are sintered together and spaced back from top layer 82 by spacers 94, which may be placed between pixels or may be placed randomly between layer 82 and spheres 88. Colorless spacers 94 maintain the cavity defined by medial layer 96 and first non-conductive layer 82 at a given thickness by preventing first non-conductive layer 82 from touching medial layer 96. This is beneficial in allowing a higher areal coverage by pigment in the non-hidden state. The colorless spacer may be made from any colorless non-conductive material. Bridge elements 86 are included to aid lamination of the layers, or the layers may be vacuum laminated. Medial layer 96 may be deposited on layer 84 by any of the methods described herein, or alternatively the spheres 88 may be mixed in a slurry with the electrophoretic liquid then deposited on layer 84 with a blade.

The cavities 90 and top space 92 are completely filled with a clear liquid, which contains colored electrophoretic pigments. For clarity, the individual colored pigments are not shown. The liquid 98 and electrophoretic pigments used in the display sheet 80 have the same properties and serve the same purpose as liquid 34 and suspended pigmented particles 32 in FIG. 2. By applying an electric field, as described above, pigment particles can be moved by electrophoretic force from cavities 90 around spheres 88 and into top space 92 or vice versa. Pixel B in FIG. 8 shows the pigments moved into top space 92 with the application of an electric field, thereby covering medial layer 96.

As described hereinabove, the electrophoretic pigment particles have a tendency to pack on layer 82 (where layer 82 forms the top surface for top space 92) in an applied electric field. Also, electrophoretic particles have a tendency to agglomerate when there is no electric field and deagglomerate when there is an electric field. Based on the aforementioned tendencies of electrophoretic particles, upon removal of the electric field, the pigments remain in top space 92 until a reverse electric field is applied to the pixel to pull the pigments back into the original cavities 90, as shown in Pixel A.

FIG. 9 shows a top view of the same two pixels, with Pixel B activated. From the top of the sheet the observer sees the agglomerated electrophoretic pigment particles in Pixel B and an unpigmented Pixel A. By way of example, the spheres may be white or gray and the pigment particles may be black. In this embodiment, the sheet would appear white or gray to an observer when the pigmented particles are contained in cavities 90 of FIG. 8. When an electric field is applied, those pixels, such as Pixel B in FIGS. 8 and 9 would appear black. In an alternative embodiment, the spheres could be a black or a color rather than white or gray, or the pigment particles could be any color as well as black.

The smart electric display sheet is capable of activating or deactivating the electrophoretic pigmented particles by a passive matrix addressing using a plurality of voltage sources contacting the display sheet at the sides of the sheet.

Although the embodiments of this invention described above utilize an electric field as the external field to move the pigmented particles within the sheet, it should be noted that any external field which can cause the pigmented particles to move from one cavity of the sheet to another cavity can replace the electric field of this invention. For example, acoustic fields, dielectric forces by applying electric field gradients, or by applying a magnetic field if ferro pigmented particles are used.

While this invention has been described based on a display which is utilized as a paper, it should be noted that the display sheet of this invention can also be utilized to replace other displays such as the display of a monitor or a display of a watch.

The advantage of the reflective display disclosed in this invention over a conventional display is that a conventional display requires back illumination. Therefore, the operation of a conventional display requires a higher electric power than the electric power needed for the display of this invention. The display of this invention requires a minimal electric power to move the pigmented particles from one cavity to another and also moves the particles more completely and effectively than existing forms of such a display sheet. After the image is displayed, until the next change on the image, there is no need for electric power since the display functions as a printed paper.

It should be understood that numerous changes in details of construction and the combination and arrangement of elements and materials may be resorted to without departing from the true spirit and scope of the invention as hereinafter claimed.

What is claimed:

1. An electrophoretic display sheet comprising:
    a first transparent non-conductive layer;
    a second non-conductive layer spaced from and opposed to said first non-conductive layer;
    a medial layer inserted between said first non-conductive layer and said second non-conductive layer, wherein said medial layer comprises a plurality of opaque spheres, said spheres forming cavities between said first non-conductive layer and said second non-conductive layer; and
    an electrophoretic suspension layer comprising at least one electrophoretic material comprising a plurality of electrophoretic pigment particles suspended in a suspending medium comprising an electrically insulating medium, wherein said electrophoretic suspension layer is contained in said cavities formed between the outer surfaces of said spheres and the inner surfaces of said first non-conductive layer and said second non-conductive layer, and wherein said electrophoretic pigments migrate through said cavities to perform a display operation when driven by an appliede electrophoretic force.

2. The electrophoretic display sheet according to claim 1, wherein said spheres are white.

3. The electrophoretic display sheet according to claim 1, wherein said spheres are black.

4. The electrophoretic display sheet according to claim 1, wherein said spheres are a color other than black or white.

5. The electrophoretic display sheet according to claim 1, wherein said medial layer comprises a single layer of disperse spheres.

6. The electrophoretic display sheet according to claim 1, wherein said medial layer comprises at least two layers of disperse spheres.

7. The electrophoretic display sheet according to claim 6, wherein said medial layer comprises spheres packed within the layer as closely together as practicable.

8. The electrophoretic display sheet according to claim 6, wherein said medial layer comprises spheres all substantially the same size.

9. The electrophoretic display sheet according to claim 6, wherein said medial layer comprises spheres which are sintered together.

10. The electrophoretic display sheet according to claim 1, wherein said medial layer is spaced from said first non-conductive layer.

11. The electrophoretic display sheet according to claim 10, further comprising a plurality of spacers between said first non-conductive layer and said medial layer.

12. The electrophoretic display sheet according to claim 10, further comprising side housing walls between which said first non-conductive layer, said medial layer, and said second non-conductive layer are positioned.

13. The electrophoretic display sheet according to claim 1, wherein said suspending medium is clear.

14. The electrophoretic display sheet according to claim 1, wherein said suspending medium is colored.

15. The electrophoretic display sheet according to claim 1, wherein said electrophoretic material is black.

16. The electrophoretic display sheet according to claim 1, wherein said electrophoretic material is a color.

17. The electrophoretic display sheet according to claim 1, wherein said second non-conductive layer is transparent.

18. The electrophoretic display sheet according to claim 1, wherein said spheres within said medial layer are sintered together.

19. The electrophoretic display sheet according to claim 1, wherein said medial layer comprises at least on layer of spheres packed within the layer as closely together as practicable.

20. The electrophoretic display sheet according to claim 1, wherein said medial layer comprises spheres all substantially the same size.

* * * * *